United States Patent
Avery, Jr. et al.

(10) Patent No.: US 7,298,249 B2
(45) Date of Patent: Nov. 20, 2007

(54) SYSTEM AND METHOD FOR DISPLAYING ENGINE FAULT CONDITIONS IN A VEHICLE

(75) Inventors: Richard M. Avery, Jr., West Bloomfield, MI (US); Tomislav Ivo Golub, Birmingham, MI (US); Leopold Super, Dearborn, MI (US)

(73) Assignee: Detroit Diesel Corporation, Detroit, MI (US)

( * ) Notice: Subject to any disclaimer, the term of this patent is extended or adjusted under 35 U.S.C. 154(b) by 236 days.

(21) Appl. No.: 10/996,548

(22) Filed: Nov. 23, 2004

(65) Prior Publication Data

US 2006/0119475 A1    Jun. 8, 2006

(51) Int. Cl.
*B60Q 1/00*    (2006.01)
(52) U.S. Cl. .............. 340/439; 340/438; 340/461; 340/815.4; 345/30

(58) Field of Classification Search ............ 340/439, 340/438, 461, 815.41, 815.4; 345/30
See application file for complete search history.

(56) References Cited

U.S. PATENT DOCUMENTS

| | | | |
|---|---|---|---|
| 4,271,402 A | 6/1981 | Kastura et al. | |
| 4,398,258 A | 8/1983 | Naitoh et al. | |
| 4,497,057 A | 1/1985 | Kato et al. | |
| 4,635,214 A | 1/1987 | Kasai et al. | |
| 4,817,418 A | 4/1989 | Asami et al. | |
| 5,265,468 A | 11/1993 | Holst et al. | |
| 5,949,345 A * | 9/1999 | Beckert et al. | 340/815.41 |
| 6,507,918 B1 | 1/2003 | Last et al. | |
| 6,601,015 B1 | 7/2003 | Milvert et al. | |
| 6,812,942 B2 * | 11/2004 | Ribak | 345/30 |

* cited by examiner

*Primary Examiner*—Davetta W. Goins
(74) *Attorney, Agent, or Firm*—Brooks Kushman P.C.

(57) ABSTRACT

A method for displaying engine fault conditions in a vehicle. The method includes monitoring at least one sensor, determining when at least one fault condition has occurred, and masking indication of the at least one fault condition from at least one fault display device in response to at least one instruction.

20 Claims, 4 Drawing Sheets

| | Latch Across Cycles | Mask Display Device Da | Mask Display Device Db | ... | Mask Display Device Dn |
|---|---|---|---|---|---|
| Fault_Fa | 1 | 0 | 1 | | 0 |
| Fault_Fb | 0 | 1 | 0 | | 0 |
| ⋮ | | | | | |
| Fault_Fn | 0 | 0 | 0 | | 0 |

| | Lamps | Active Messages | Inactive Messages |
|---|---|---|---|
| Fault_Fa | 0 | 0 | 0 |
| Fault_Fb | 0 | 0 | 1 |
| Fault_Fc | 0 | 1 | 0 |
| Fault_Fd | 0 | 1 | 1 |
| Fault_Fe | 1 | 0 | 0 |
| Fault_Ff | 1 | 0 | 1 |
| Fault_Fg | 1 | 1 | 0 |
| Fault_Fh | 1 | 1 | 1 |

SYSTEM AND METHOD FOR DISPLAYING ENGINE FAULT CONDITIONS IN A VEHICLE

BACKGROUND OF THE INVENTION

1. Field of the Invention

The present invention relates to a system and a method for displaying engine fault conditions in a vehicle.

2. Background Art

Internal combustion engines, and in particular, compression ignition (or diesel) engines have a wide variety of applications including passenger vehicles, marine vessels, earth-moving and construction equipment, stationary generators, and on-highway trucks, among others. Electronic engine controllers (i.e., engine control modules (ECMs)) provide a wide range of flexibility in tailoring engine performance to a particular application without significant changes to engine hardware. The ECMs typically tailor engine performance by monitoring a set of engine parameters. The parameter set may include such inputs as engine operating temperature, position of some actuators, oil pressure, oil level, oil temperature, coolant temperature, and the like.

When an engine parameter deviates from a predetermined level, value, or range, a warning is typically generated by the ECM (i.e., a problem is reported). Warnings are typically displayed via a check engine lamp (CEL), a service now lamp (SNL), or an alpha-numeric display. Both the CEL and SNL are typically mounted in the vehicle instrument panel and illuminate to alert the vehicle operator that a fault has occurred. In addition, both the CEL and SNL are used by service technicians to read out or "flash out" trouble codes using appropriate diagnostic equipment such that the technician can gain further insight into a reported problem. The process of "flashing out" causes at least one of the CEL and SNL to blink in a sequence that has been predetermined to correspond with (i.e., signifies the presence of) a particular fault. Similarly, alpha-numeric displays may be implemented to convey (i.e., read out) fault information to the operator and service technicians without interpretation of the flash patterns associated with CELs and SNLs.

As described above, conventional engine fault systems display all faults. Due to the increased complexities of modern engines, however, the ECM may generate fault signals or alerts that would unnecessarily distract vehicle operators. As such, there exists a need for an improved system and an improved method for displaying vehicle engine faults.

SUMMARY OF THE INVENTION

The present invention generally provides new, improved and innovative techniques for displaying vehicle engine fault conditions. The improved system and method for displaying vehicle engine faults of the present invention may provide for greater flexibility in determining the manner and duration of fault display. In addition, the present invention may provide a greater number of fault displays such that operator relevant faults and service technician relevant faults may be further segregated when compared to conventional approaches.

According to the present invention, a method for displaying engine fault conditions in a vehicle is provided. The method comprises monitoring at least one sensor, determining when at least one fault condition has occurred, and masking indication of the at least one fault condition from at least one fault display device in response to at least one instruction.

Also according to the present invention, a system for displaying engine fault conditions in a vehicle is provided. The system comprises at least one fault display device, and a controller electrically coupled to the at least one fault display device and having a memory. The memory is configured to store at least one instruction such that indication of at least one fault condition is masked from the at least one fault display device in response to the at least one instruction.

Further, according to the present invention, a method for displaying engine fault conditions in a vehicle is provided. The method comprises mounting a first fault display device within an operator compartment of a vehicle, and a second fault display device within an engine compartment of a vehicle. The method further includes monitoring at least one sensor using a controller having a memory configured to store at least one instruction, determining when at least one fault condition has occurred, masking indication of the at least one fault condition from at least one of the first fault display device and the second fault display device in response to the at least one instruction, and latching the fault condition such that the fault condition is held active across a plurality of engine ignition cycles in response to a second instruction.

The above features, and other features and advantages of the present invention are readily apparent from the following detailed descriptions thereof when taken in connection with the accompanying drawings.

BRIEF DESCRIPTION OF THE DRAWINGS

FIGS. 4(*a-b*) are diagrams illustrating programmable display states according to embodiments of the present invention.

DETAILED DESCRIPTION OF THE PREFERRED EMBODIMENT(S)

Figure 1:
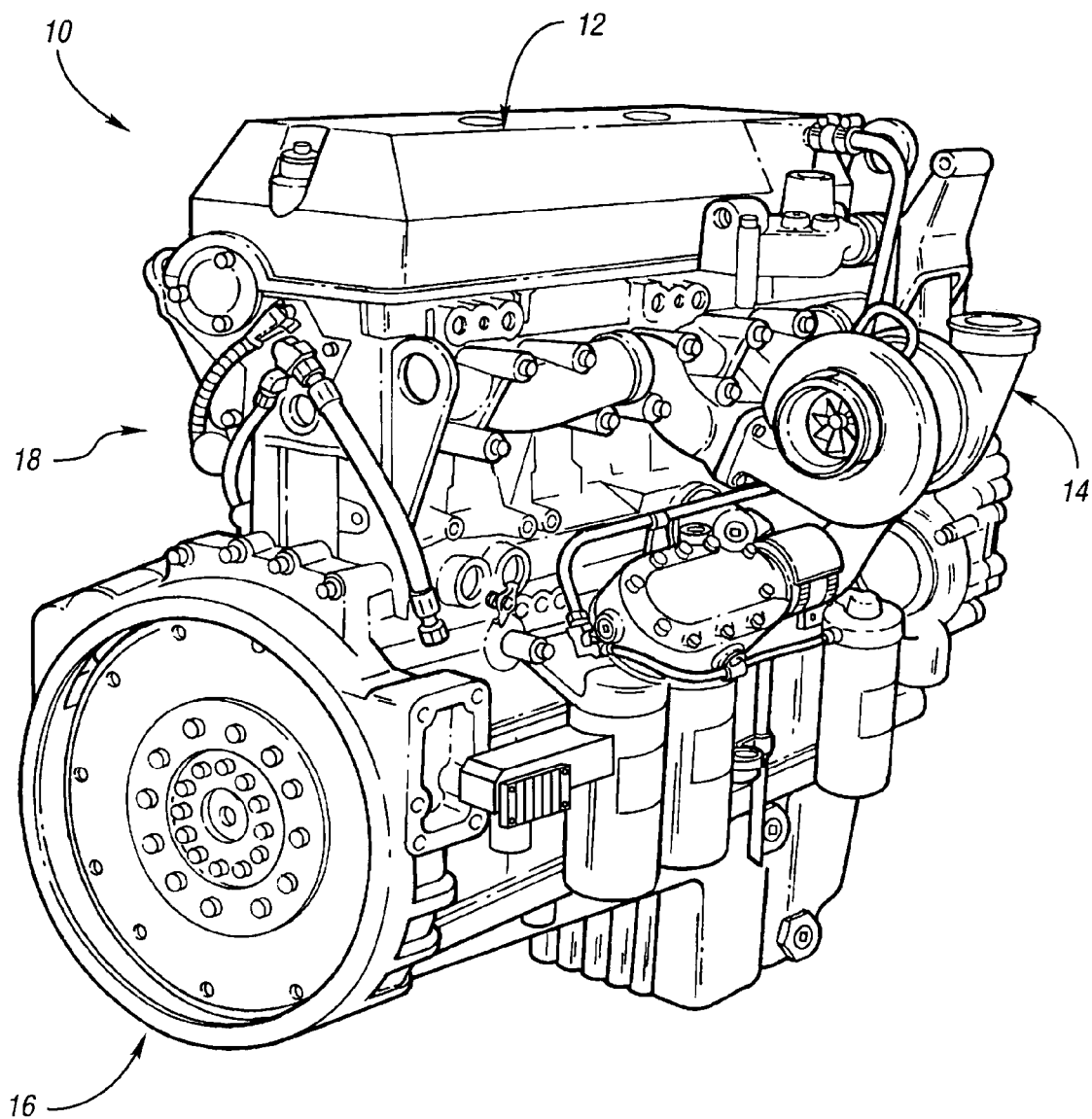
FIG. 1 is a diagram illustrating a compression ignition engine incorporating various features of the present invention.

Referring to FIG. 1, a perspective view illustrating a compression-ignition internal combustion engine 10 incorporating various features according to the present invention is shown. The engine 10 may be implemented in a wide variety of applications including on-highway trucks, construction equipment, marine vessels, stationary generators, and the like. The engine 10 generally includes a plurality of cylinders disposed below a corresponding cover, indicated generally by reference numeral 12. In a preferred embodiment, the engine 10 is a multi-cylinder compression ignition internal combustion engine, such as a 4, 6, 8, 12, 16, or 24 cylinder diesel engine. However, the engine 10 may be implemented having any appropriate number of cylinders 12, the cylinders 12 having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankine cycle, Miller cycle, etc.) using an appropriate fuel to meet the design criteria of a particular application.

The engine 10 generally includes an engine control module (ECM), powertrain control module (PCM), or controller indicated generally by reference numeral 14. The ECM 14 generally communicates with various engine sensors and actuators via associated cabling or wires 18, to control the engine 10. In addition, the ECM 14 communicates with an engine operator (not shown) and service technicians (not shown) using associated lights, switches, displays, and the like (shown in detail in FIGS. 2(a-b)). The engine 10 may be mounted (i.e., installed, implemented, positioned, disposed, etc.) in a vehicle 98 (shown in detail in FIG. 3). The engine 10 may be coupled to a transmission (not shown) via flywheel 16.

Figure 2A:
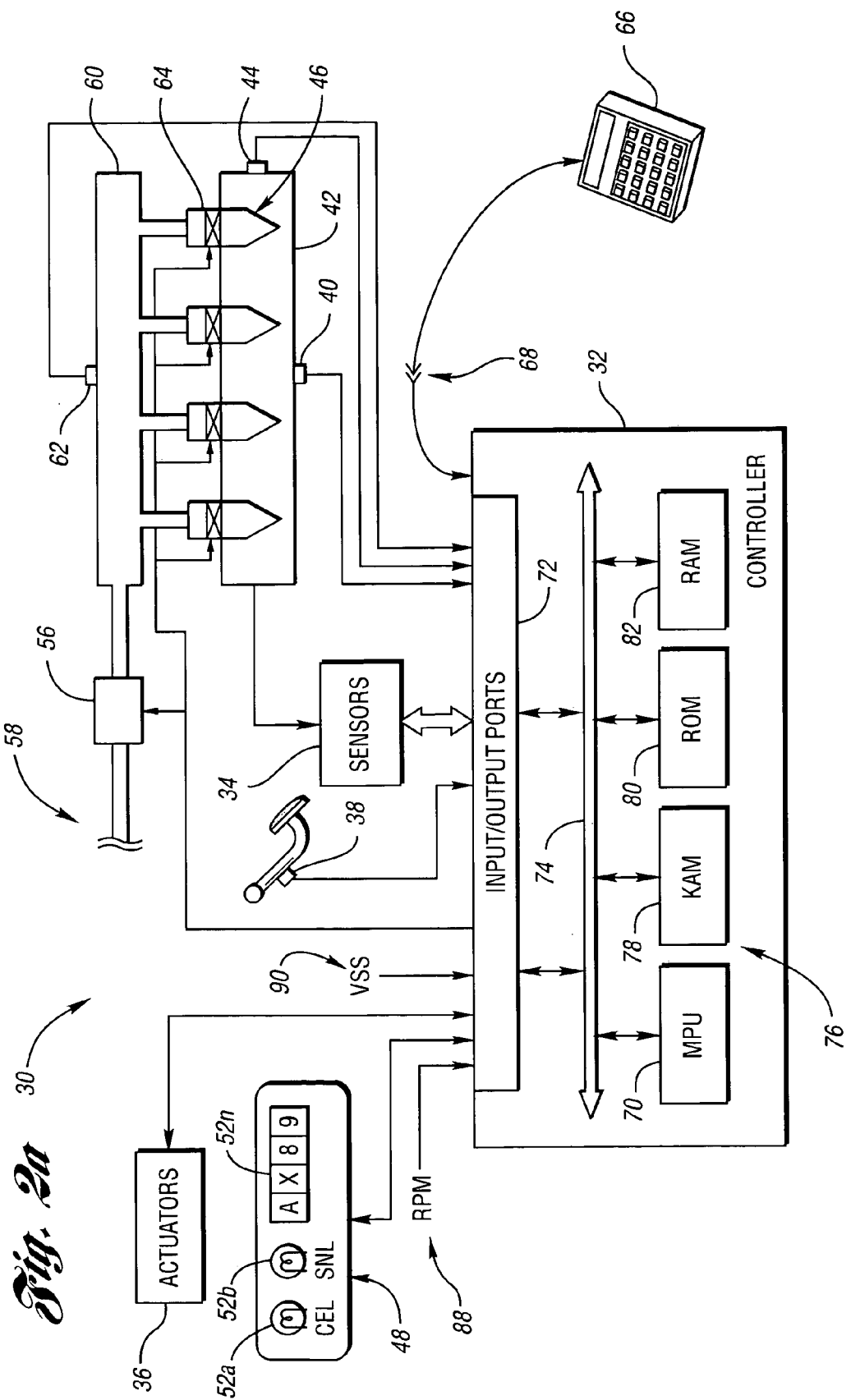
FIGS. 2(*a-b*) are diagrams illustrating systems for controlling an engine and displaying engine fault conditions according to the present invention.

Referring to FIG. 2a, a diagram illustrating a system 30 for controlling an engine and for displaying system fault conditions according to the present invention is shown. The system 30 may be implemented in connection with the engine 10 of FIG. 1. The system 30 includes a controller (e.g., ECM, PCM, and the like) 32 in communication with various sensors 34 and actuators 36. The sensors 34 may include various position sensors such as an accelerator or brake position sensor 38. Likewise, the sensors 34 may include a coolant temperature sensor 40 which generally provides an indication of the temperature of engine block 42. In addition, an oil pressure sensor may be used to monitor the engine 10 operating conditions by providing an appropriate signal to the controller 32. However, any appropriate sensor (e.g., oil temperature, oil level, air flow, etc.) may be implemented to meet the design criteria of a particular application.

Other sensors may include rotational sensors to detect the rotational speed of the engine 10, such as RPM sensor 88 and a vehicle speed sensor (VSS) 90 in some applications. The VSS 90 generally provides an indication of the rotational speed of the output shaft or tailshaft (not shown) of the transmission. The speed of the shaft monitored via the VSS 90 may be used to calculate the vehicle speed. The VSS 90 may also represent one or more wheel speed sensors which may be used in anti-lock breaking system (ABS) applications, vehicle stability control systems, and the like.

The actuators 36 may include various engine components which are operated via associated control signals from the controller 32. The various actuators 36 may also provide signal feedback to the controller 32 relative to the actuator 36 operational state, in addition to feedback position or other signals used to the control actuators 36. The actuators 36 preferably include a plurality of fuel injectors 46 which are controlled via associated (or respective) solenoids 64 to deliver fuel to the corresponding cylinders 12. In one embodiment, the controller 32 controls a fuel pump 56 to transfer fuel from a source 58 to a common rail or manifold 60 at a fuel pressure that may be monitored via a pressure sensor 62. However, in another example, the present invention may be implemented in connection with a direct injection engine. Operation of the solenoids 64 generally controls delivery of the timing and duration of fuel injection (i.e., an amount, timing and duration of fuel).

While the representative control system 30 illustrates an example application environment of the present invention, as noted previously the present invention is not limited to any particular type of engine control system and thus may be implemented in any appropriate engine and/or engine system to meet the design criteria of a particular application.

The sensors 34 and the actuators 36 may be used to communicate status and control information to the engine operator via a console 48. The console 48 is preferably positioned in close proximity to the engine operator, such as in a cab (i.e., operator compartment, passenger compartment, cabin, etc.) of the vehicle 98 (or environment) where the system 30 is implemented. The console 48 may include various indicators 52 (e.g., indicators 52a-52n). Each of the indicators 52 may have respective control logic that determines when the respective indicators 52 are activated (i.e., turned on, lighted, etc.).

The indicators 52 may include visual indicators. In particular, the console may include at least one of a check engine lamp (CEL) 52a, a service now lamp (SNL) 52b, and an alpha-numeric display 52n. Both the CEL 52a and the SNL 52b may illuminate to alert the vehicle operator that a fault has occurred. In addition, both the CEL 52a and the SNL 52b may be used by service technicians to "flash out" (i.e., read out) trouble codes (i.e., fault codes) such that the technician can gain further insight into a reported (or indicated) problem.

The process of "flashing out" generally causes at least one of the CEL 52a and the SNL 52b to blink (or flash) in a sequence that has been predetermined to correspond with (i.e., signifies the presence of, is associated with, relates to, etc.) a particular fault. Similarly, alpha-numeric displays 52n may be implemented to convey (i.e., present) fault information to the operator and service technicians without interpretation of the flash patterns associated with the CELs 52a and the SNLs 52b. However, the indicators 52 may include any of a number of audio and visual indicators such as lights, displays, buzzers, alarms, and the like.

As used throughout the description of the present invention, at least one selectable (i.e., programmable, predetermined, adjustable, modifiable, etc.) limit (i.e., threshold, level, interval, value, amount, etc.) or range of values may be selected by any of a number of individuals (i.e., users, operators, owners, service technicians, drivers, etc.) via a programming device (i.e., configuration tool, diagnostic equipment, etc.), such as device 66, selectively connected to the controller 32 via an appropriate plug or connector 68.

Rather than being primarily controlled by software, the selectable (or programmable) limit (or range) may also be provided by an appropriate hardware circuit having various switches, dials, and the like. Alternatively, the selectable (or programmable) limit may also be changed using a combination of software and hardware without departing from the spirit of the present invention. However, the at least one of the selectable value and the range may be predetermined and/or modified by any appropriate apparatus and method to meet the design criteria of a particular application. Any appropriate number and type of sensors, indicators, actuators, etc. may be implemented to meet the design criteria of a particular application.

In one embodiment, the controller 32 generally includes a programmable microprocessing unit 70 in communication with (i.e., electrically coupled to, interfaced to, etc.) the various sensors 34 and the actuators 36 via at least one input/output port 72. The input/output ports 72 may provide an interface in terms of processing circuitry to condition the signals, protect the controller 32, and provide appropriate signal levels depending on the particular input or output device. The processor 70 generally communicates with the input/output ports 72 using a conventional data/address bus arrangement 74. Likewise, the processor 70 generally communicates with various types of computer-readable storage media 76 which may include a keep-alive memory (KAM) 78, a read-only memory (ROM) 80, and a random-access memory (RAM) 82.

The various types of computer-readable storage media 76 generally provide short-term and long-term storage of data used by the controller 32 to control the engine 10, to store the codes that may be displayed via the indicators 52 and the device 66, to store instructions to control masking of codes displayed, and the like. The computer-readable storage media 76 may be implemented by any of a number of known physical devices capable of storing data representing instructions executable by the microprocessor 70. Such devices may include PROM, EPROM, EEPROM, flash memory, and the like in addition to various magnetic, optical, and combination media capable of temporary and/or permanent data storage.

The computer-readable storage media 76 may include data representing program instructions (e.g., software), calibrations, routines, steps, blocks, operations, operating variables, and the like used in connection with associated hardware to control the various systems and subsystems of the engine 10 and/or the vehicle 98. The engine/vehicle control logic is generally implemented via the controller 32 based on the data stored in the computer-readable storage media 76 in addition to various other electric and electronic circuits (i.e., hardware, firmware, etc.).

The controller 32 generally includes control logic to generate and control the display of engine fault conditions (e.g., via the indicators 52, the device 66, etc.). In general, faults are generated in response to a sensor 34 presenting a value (e.g., a level of a signal) outside the selectable limits. However, fault codes may be generated in response to any appropriate condition to meet the design criteria of a particular application.

Each fault condition may be associated with at least one programmable display state determined by a routine (e.g., configuration, operations, instructions, process, procedure, algorithm, steps, blocks, etc.) (shown in detail in FIGS. 4(a-b)) stored in the controller memory 76. The display routine for a fault generally includes instructions that measure (or monitor) parameters and determine how the fault is displayed by fault display devices (e.g., the indicators 52, the diagnostic equipment 66, etc.).

In one example, a display routine may monitor at least one parameter to determine when the fault is hidden (i.e., masked) from display by the in-cab indicator device 52. The same display procedure may monitor a second parameter to determine when the fault is hidden from display at a calibration tool (i.e., programming device 66). In general, a fault is hidden (i.e., masked, prevented from being viewed, etc.) from a fault display device when the active status of the fault is not conveyed to the device. However, the vehicle controller (e.g., ECM, PCM, and the like) 32 may continue to control the engine 10 in response to the active status of the hidden fault.

In one example, the fault display device (e.g., indicator device 52) is a light (e.g., the CEL 52a, the SNL 52b, etc.) and the fault may be masked by preventing the activation (e.g., illumination) of the light in response to the active state of the fault. In another example, the fault display device may monitor communication transmissions from the controller 32 (e.g., an alpha-numeric display 52n, calibration tool, programming device 66, etc.) and the masking is generally performed by omitting the fault from a list of active faults generated and transmitted by the controller 32. In yet another example, the fault display device may monitor communication transmissions from the controller 32 and the masking may be performed by omitting the fault from a list of inactive faults generated and transmitted by the controller 32. However, the active status of a fault may be masked from a fault display device using any appropriate logic control (i.e., routine, process, operation, method, steps, instructions, etc.) to meet the design criteria of a particular application.

Overall fault masking may be activated and deactivated (i.e., enabled and disabled, respectively) by setting and resetting, respectively, a predetermined enable/disable parameter (e.g., flag) in the memory 76 of the controller 32. The predetermined enable/disable parameter may be set/reset using the programming device 66. When the overall fault masking is deactivated, fault information is generally not masked from any fault display device.

In addition to the masking parameters, the programmable display state process may include monitoring (e.g., measuring, calculating, determining, etc.) at least one parameter to set (i.e., activate, turn on, etc.) latching (i.e., holding, maintaining, etc.) of the corresponding fault across multiple engine ignition cycles. When a fault is latched, the fault is generally held on upon initial activation regardless of subsequent fault status of the monitored parameter. In one example, the latched fault condition (or status) related to at least one parameter may be manually reset by a technician using the programming device (i.e., calibration tool) 66. In another example, the controller 32 may reset the latched fault upon the occurrence of a predetermined event (e.g., passage of a predetermined time, completion of a predetermined number of ignition cycles, and the like).

Figure 2B:
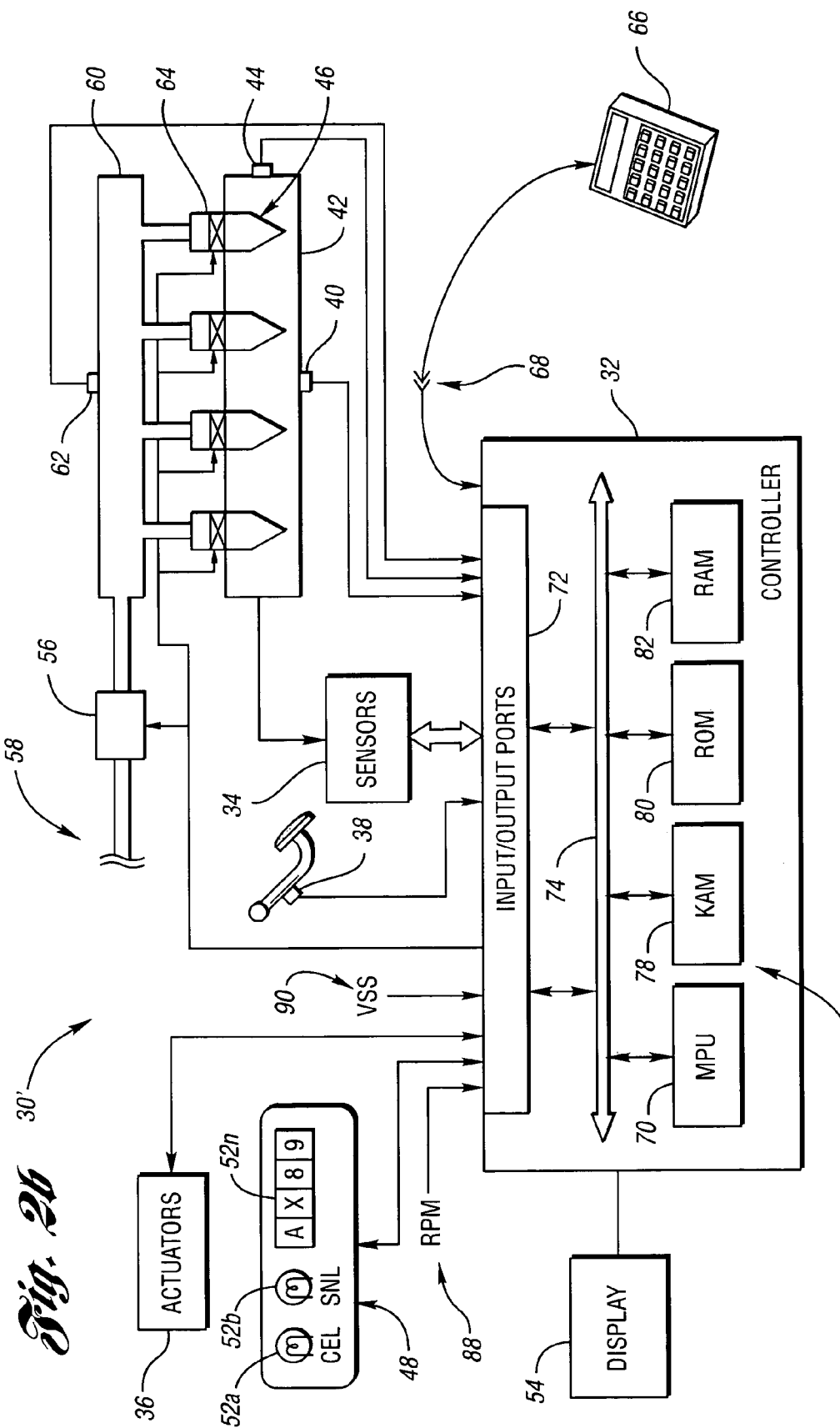

Referring to FIG. 2b, a diagram illustrating a system 30' for displaying engine fault conditions according to the present invention is shown. The system 30' may be implemented similarly to the system 30 except that a second fault display device 54 may be mounted (i.e., disposed, installed, provided, etc.) in the engine compartment of the vehicle 98 (shown in detail in FIG. 3). Each fault display state process may monitor at least one parameter (e.g., signal presented by at least one of a sensor 34 and an actuator 36) and determine when the fault is to be hidden (i.e., masked) from the second display device 54.

In one example, the display process may be defined (i.e., programmed) such that a fault is masked from the in-cab display device 52 and not masked from the engine display device 54. As such, the respective embodiment provides for observation of the fault using the engine display device 54 while the fault is hidden from the operator viewable device 52 (i.e., an in-cab device). In another example, the display state routine may be programmed such that the engine display device 54 is configured to mimic (i.e., copy, simulate, follow, etc.) the operation of the in-cab device 52. As such, the engine display device 54 may provide redundancy for the in-cab device 52. However, the programmable display state processes for each fault may be configured such that the active status of the fault is masked from any combination of display devices to meet the design criteria of a particular application.

Figures 3, 4A, 4B:
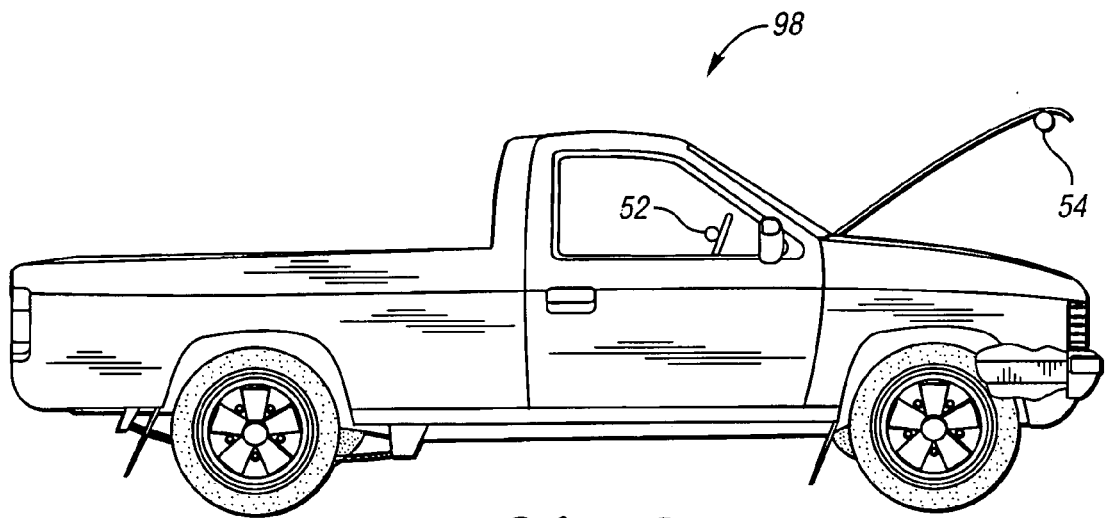
FIG. 3 is a diagram illustrating the placement of fault display devices in a vehicle according to one embodiment of the present invention.

Referring to FIG. 3, a diagram illustrating placement of the fault display devices 52 and 54 in the vehicle 98 in accordance with one embodiment of the present invention is shown. Placement of the devices 52 and 54 may be implemented in connection with the system 30' shown in detail in FIG. 2b. However, one skilled in the art would recognize that the present invention is generally not dependent upon the particular location of the display devices (e.g., the devices 52 and 54).

Referring to FIG. 4a, a diagram 100 illustrating an example of the programmable display states of the present invention is shown. Each fault (e.g., Fault_Fa-Fault_Fn) may be associated with (e.g., addressed to and from, related to, correspond to, etc.) a plurality of records (or memory 76 registers) 102 containing masking and latching instructions. Each Fault_F may be a logical signal (e.g., a logical 1, or TRUE state) that is generated or presented when a respective parameter deviates from a predetermined value or range. Masking and latching may be associated with display (or indicating) devices D (e.g., Da-Dn). The controller 32 may contain instructions such that when a Fault_F occurs, the respective display D masking and latching operations are performed.

For example, the display of Fault_Fa may be implemented (e.g., on the indicator 52 and the device 66) such that the Fault_Fa is masked from display device Db and latched across a predetermined number of ignition cycles of the engine 10. The masking of display device Db generally prohibits the device Db from indicating an active (e.g., on) state of the Fault_Fa. All other display devices D (e.g., the devices Da, Dn) may provide an indication of the status of the Fault_Fa. Similarly, the display of the Fault_Fb may be implemented such that the Fault_Fb may be masked from the display device Da. As such, the device Da generally does not indicate an active state of the Fault_Fb. All other display devices D (e.g., the devices Db-Dn), however, may indicate the active state of the Fault_Fb. The Fault_Fb may not be latched across the predetermined number of ignition cycles since a respective latch bit is not set for Fault_Fb in the controller 32.

Referring to FIG. 4b, a diagram 100' illustrating another embodiment of the programmable display states of the present invention is shown. The display configuration 100' may be related to a plurality of records (or memory 76 registers) 102' (e.g., registers 102a'-102c'). Each record 102' (e.g., the records 102a', 102b', 102c') may be associated with at least one display device such that a group of similarly acting devices generally operates in response to a given fault condition (e.g., Fault_Fa-Fault_Fh) in a like manner. For example, the state 102a' may be associated with devices receiving a voltage to activate a lamp (e.g., the CEL 52a, the SNL 52b, and the like) such that a given fault may be selectively masked from lamp display devices 52 by setting the value (or state) of the register 102a' HIGH (i.e., logical state ON, TRUE, 1, etc.).

Similarly, the registers 102b' and 102c' may be associated with devices that monitor a list of active/inactive faults (e.g., an alpha-numeric display 52n, calibration tool, programming device 66, etc.), respectively, transmitted by the controller 32. As such, a given fault may be selectively masked from devices monitoring the active/inactive message (i.e., signals Fault_F) transmissions by setting the value of 102b' and 102c' HIGH, respectively.

As illustrated in the FIG. 4b, Fault_Fa is generally displayed via all display devices since the registers 102a', 102b' and 102c' are all set to logical LOW (i.e., logical state OFF, FALSE, 0, etc.). In contrast, Fault_Fb is generally masked from the devices monitoring the inactive fault messages since the register 102c' is set HIGH. Similarly, because registers 102a' and 102b' are set HIGH and register 102c' is set LOW, Fault_Fg may be displayed by the devices monitoring the inactive fault messages, however, Fault_Fg is generally masked from the devices that either activate a lamp based upon a voltage signal or monitor the active fault messages. As such, setting a register 102' HIGH generally masks the corresponding fault from the devices in the associated device group. Likewise, setting a register 102' LOW generally allows the corresponding fault to be displayed by the devices in the associated group.

While the registers (e.g., the registers 102 and 102') have been illustrated in the FIG. 4b as being set HIGH (i.e., "on", enabled, asserted, presented, at a logic TRUE state or level, etc.) when the register value is set equal to 1, and set LOW (i.e., "off", disabled, de-asserted, not presented, at a logic FALSE state or level, etc.) when the register value is set equal to 0, any of the register values may be reversed or inverted to meet the design criteria of a particular application.

Furthermore, while masking has been described as being enabled when the registers (e.g., the registers 102 and 102') are set HIGH (i.e., "on", enabled, asserted, presented, at a logic TRUE, 1 state or level, etc.) and disabled when the registers are set LOW (i.e., "off", disabled, de-asserted, not presented, at a logic FALSE, 0 state or level, etc.) any of the register states may be reversed or inverted to meet the design criteria of a particular application.

As will be recognized by one skilled in the art, the programmable display states of the present invention may comprise any appropriate number of records (e.g., the records 102 and 102') corresponding to any number of faults (e.g., Fault_Fa-Fault_Fn) to meet the design criteria of a particular application. In addition, a display configuration routine may be located within a single block of the controller memory 76 as well as distributed among a plurality of locations in memory 76 without departing from the spirit or scope of the present invention.

As is readily apparent from the forgoing description, then, the present invention generally provides an improved apparatus and method for displaying vehicle engine fault conditions. The improved system and method for displaying vehicle engine faults of the present invention may provide for greater flexibility in determining the manner and duration of fault display. In addition, the present invention may provide a greater number of fault displays such that operator relevant faults and service technician relevant faults may be further segregated when compared to conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for displaying engine fault conditions in a vehicle, the method comprising:
   monitoring at least one sensor;
   determining when at least one fault condition has occurred; and
   masking indication of the at least one fault condition from at least one fault display device in response to at least one instruction.

2. The method of claim 1, further comprising latching the at least one fault condition in response to another instruction such that the fault is held active until the occurrence of a predetermined event.

3. The method of claim 2, further comprising holding the latched fault condition active until the fault is manually cleared.

4. The method of claim 1, wherein the at least one fault display device is a visual indicator disposed within an operator compartment of the vehicle.

5. The method of claim 1, wherein the at least one fault display device is a visual indicator disposed within an engine compartment of the vehicle.

6. The method of claim 1, wherein the at least one fault display device is an alpha-numeric display disposed within an operator compartment of the vehicle.

7. The method of claim 1, wherein the at least one fault display device is a calibration tool.

8. The method of claim 1, further comprising activating a first display device within an operator compartment of the vehicle in response to at least one first display device instruction, and activating a second display device within an engine compartment of the vehicle in response to at least one second display device instruction.

9. The method of claim 1, wherein the step of masking the indication of the at least one fault condition further comprises masking the at least one fault condition from at least one of a list of active fault conditions transmitted to a display device and a list of inactive fault conditions transmitted to a display device.

10. The method of claim 1, wherein the masking is enabled and disabled using a calibration tool.

11. A system for displaying engine fault conditions in a vehicle, the system comprising:
at least one fault display device; and
a controller electrically coupled to the at least one fault display device and having a memory, wherein the memory is configured to store at least one instruction such that indication of at least one fault condition is masked from the at least one fault display device in response to the at least one instruction.

12. The system of claim 11, wherein a second instruction latches the at least one fault condition active across a plurality of engine ignition cycles.

13. The system of claim 11, wherein the at least one fault display device is a visual indicator disposed within an operator compartment of the vehicle.

14. The system of claim 11, wherein the at least one fault display device is a visual indicator disposed within an engine compartment of the vehicle.

15. The system of claim 11, wherein the at least one fault display device is an alpha-numeric display disposed within an operator compartment of the vehicle.

16. The system of claim 11, wherein the at least one fault display device is a calibration tool.

17. The system of claim 11, further comprising:
a first display device disposed within an operator compartment of the vehicle, a second display device disposed within an engine compartment of the vehicle, wherein the first display device is activated in response to a first device instruction and the second display device is activated in response to a second device instruction.

18. The system of claim 11, wherein the indication of the at least one fault condition is masked in response to the at least one instruction from at least one of a list of active fault conditions transmitted to the at least one display device, and a list of inactive fault conditions transmitted to the at least one display device.

19. The system of claim 11, further comprising an enable/disable instruction, wherein the enable/disable instruction is set and reset in the controller memory to activate and deactivate, respectively, the masking of the at least one fault condition.

20. A method for displaying engine fault conditions in a vehicle, the method comprising:
mounting a first fault display device within an operator compartment of a vehicle and a second fault display device within an engine compartment of a vehicle;
monitoring at least one sensor using a controller having a memory configured to store at least one instruction;
determining when at least one fault condition has occurred;
masking indication of the at least one fault condition from at least one of the first fault display device and the second fault display device in response to the at least one instruction; and
latching the fault condition such that the fault condition is held active across a plurality of engine ignition cycles in response to a second instruction.

* * * * *